April 9, 1946.  W. NEUMANN  2,398,322
COMBINATION AIR FILTER AND SILENCER
Filed Jan. 31, 1945
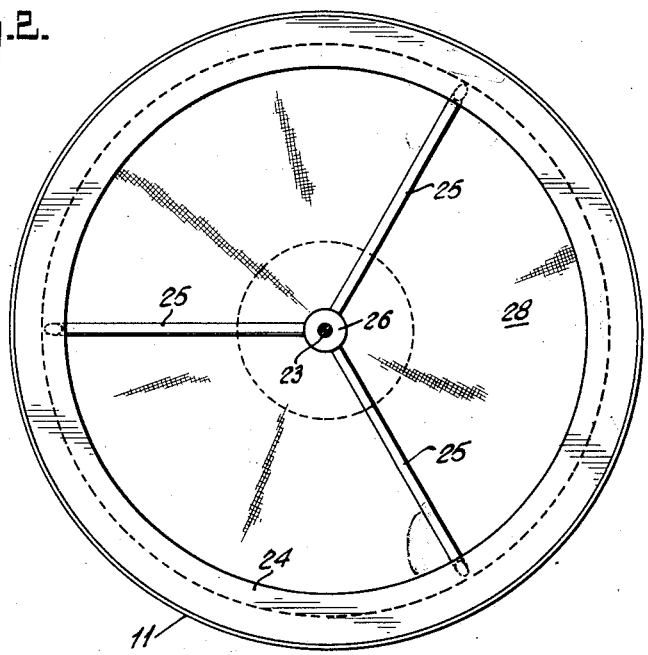
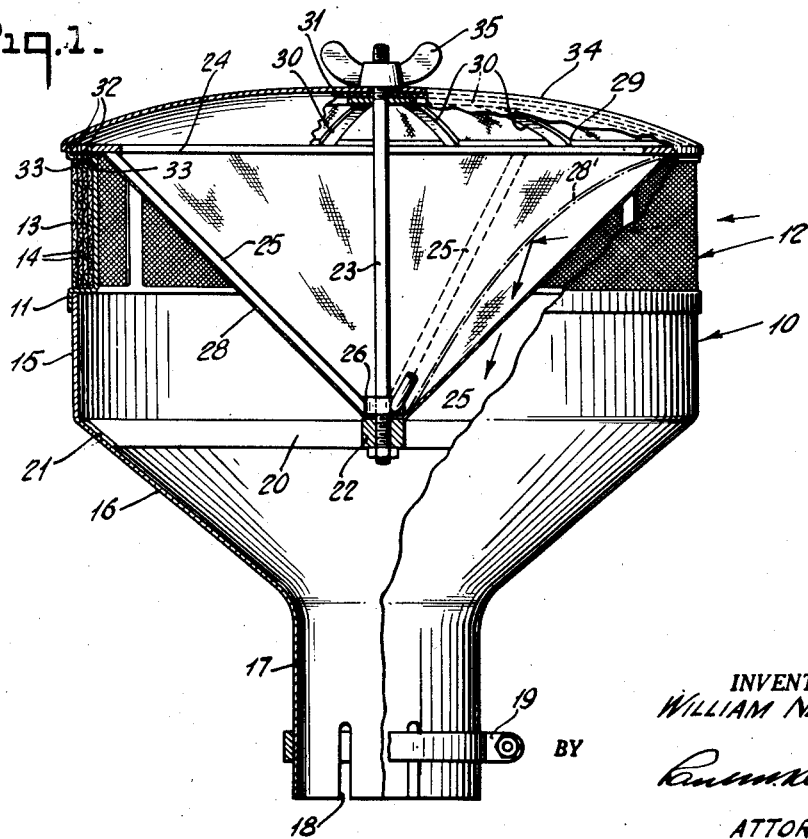
INVENTOR.
WILLIAM NEUMANN.
BY
ATTORNEY.

Patented Apr. 9, 1946

2,398,322

UNITED STATES PATENT OFFICE 2,398,322

COMBINATION AIR FILTER AND SILENCER

William Neumann, Queens Village, N. Y.

Application January 31, 1945, Serial No. 575,412

9 Claims. (Cl. 181—42)

This invention relates to combination air filter and engine noise silencing devices especially adapted for use in connection with internal combustion engines of motor vehicles.

Combination air filters and engine noise silencers adapted to be associated with the air intake leading to the carburetor of engines are well-known in the art, but usualy have the disadvantage of being too complicated in their construction and of impeding the free flow of air to the engine to such an extent that as a result an insufficiency of air is caused for properly supporting combustion of the fuel. The means employed in such devices for diminshing or deadening the "engine noises" are usually in the form of complex air labyrinths, which in most cases diminish the area through which air must pass, thereby increasing its rate of speed at points where it is desirable to reduce such speed.

The present invention is primarily designed for the combined purposes of firstly, effecting by novel and most simple means a thorough filtering or cleansing of the air, at a speed most advantageous for that function, before the air reaches the carburetor, secondly, to increase the air speed after the cleansing operation, and, finally, to deaden "engine noises" without impeding the flow of air, or decreasing the required volume of air for proper combustion.

The prime object of this invention is to provide a simple, inexpensive and efficient combination air filter and silencer, consisting of a minimum of parts which are so designed that they may be readily assembled and disassembled for the purpose of cleansing or treating them to be always retained in proper operative condition, and which device effectively prevents dirt from entering the engine, and at the same time so muffles the "engine noises" that they are nearly undiscernible.

The foregoing and still other objects and important advantages of the present invention will become more fully apparent from the ensuing description in connection with the accompanying drawing, in which:

Fig. 1 is a side elevation of the device partially in cross section; and

Fig. 2 is a top view thereof with its cover removed.

Referring now specifically to the figures, the device comprises a spacious, substantially cylindrical air chamber 10, at the upper portion of which is provided a filter support 11, within which is accommodated manifold filter element 12, preferably consisting of a series of layers of wire screening 13 between which layers are provided separating spaces 14 for trapping dirt. Filter support 10 is flanged both on top and bottom and sits with its lower flanged edge over the upper edge of solid portion 15 of chamber 10. From portion 15 extends downwardly a funnel 16 terminating in a reduced cylindrical end 17 forming the air discharge of the device. End 17 is preferably slotted at 18 and is provided with a clamping ring 19 for attaching the device over a suitable extension usually provided with existing engine carbureters. Within funnel 16 there is arranged a spider 20, the legs of which are preferably welded at 21 to the funnel body, while the middle portion of the spider forms a cylindrical threaded bead 22 adapted to accommodate a central bolt 23 extending upwards.

Resting upon the recessed upper flanged end of filter support 11 is a ring formation 24 from which extend downwardly three or more converging legs 25, and are attached at their lowermost ends to a cylindrical smoothly apertured bead 26, through which passes bolt 23. Between the lower face of ring 24 and the upper flanged end of filter support 11 is clamped the upper edge or base of an inverted cone-shaped cloth member 28, the apex of which is held between spider bead 22 and bead 26. The frame formed by ring 24, legs 25 and bead 26 is designed to normally hold cloth cone 28 in its intended cone-shaped form, however the cone portions between each two legs 25 are capable of being moved inward by air sucked in through filter 12 into chamber 10, in the manner indicated at 28' in broken lines at the right-hand portion of Fig. 1.

On top of ring 24 sits another ring 29 from which extend upwardly supporting rigs 30, which latter, together with ring 29, comprise a supporting spider for a fabric inlay 31. This fabric inlay is intended to be impregnated from time to time with a fire proofing liquid, which latter is transmitted through apertures 32 and 33 provided, respectively, in ring 24 and in the upper flange of filter support 11, to the mobile cone-shaped cloth member 28. Fabric inlay 31 is completely enclosed within outer metal cover 34, and is held in position between the latter and ribs 30 by means of bolt 23, which passes through cover 34, and wing nut 35.

Attention is now directed to the ratio between the filter area constituting the air intake of the device and the air discharge area within funnel end 17. It has been found that in order to achieve best results the proportion between the intake and discharge should range between ten to fifteen to one. In other words the intake area should be at least ten to fifteen times greater than the discharge area. The above ratio is intended to lessen the velocity of incoming air drawn in by the engine and to increase the velocity of the filtered air passing through cylinder 17. The lesser the velocity of the air entering the device, the more effective will be the filtering and air cleansing function of filter 12.

It will be observed that the apex of inverted cone 28 extends centrally to a point which is at a short distance from the center of the discharge within cylinder 17. While in Fig. 1 the sides of cone 28 shown in cross section are indicated as though in a rather stretched position, it to be understood that the cone material is loosely suspended from its circumferential flange clamped between ring 24 and the upper end of filter support 11, whereas only the apex is held between beads 22 and 26. Thus the cone body between the base and the apex is free and actually hangs loosely and forms so-to-speak a conical sack, which may readily yield and shape itself in response to pressure of inrushing air.

Operation

As air is drawn into the engine it has to pass through the several closely spaced layers of wire mesh in the manner indicated by the arrows in Fig. 1. The pressure of air will uniformly bear from all peripheral points against the entire area of inverted cone 28 and deform the latter to a more or less hyperbolic curvature in the manner indicated at 28'. Through that deformation of cone 28 the air is deflected in such a way that it becomes directed and concentrated towards discharge cylinder 17. The curvature imparted to the mobile cone material, coupled with its softness and yieldable property serves for effectively deadening "engine noises." The efficiency, serviceability and durability of sound-deadening cone 28 becomes considerably enhanced by its resistance to heat occasioned by the "back-fire" of the engine.

When it is desired to provide fresh fire proofing liquid to cone 28 by way of fabric layer 31, it is only necessary to unscrew wing nut 35 and to remove cover 34, whereupon inlay 31 becomes fully exposed. By removing nut 35 not only cover 34, but all the interior parts of the combination filter and silencer are rendered accessible and may be readily removed, inspected for defects, cleansed and replaced without the use of any tools.

A very important feature of this invention resides in the construction of filter 12. The entire frame holding the wire mesh screening may be bodily removed from funnel structure 10, whereby thorough washing and cleansing of the screening is greatly facilitated without the necessity of disconnecting the entire device from the engine.

While in the foregoing only one specific structure and arrangement of parts of the present invention is described in conjunction with the single embodiment illustrated in the drawing, it is to be understood that changes and improvements may become necessary to meet various requirements, and the right to such changes and improvements is hereby reserved, without departing from the broad scope of the invention as defined in the annexed claims:

I claim:

1. The combination with a hollow body having a discharge and an intake substantially larger in area than that of the discharge, air deflecting and silencing means of pliable matter operatively suspended from the top of the body and extending toward the discharge and being disposed in the path of the air current entering through the intake and being adapted to partially yield to the inflow of air and to direct such air towards the discharge.

2. In a device of the class indicated, a hollow body having a substantially cylindrical intake, a spacious, substantially funnel-shaped air-gathering chamber terminating in an air discharge considerably smaller in area than that of the intake, and combination air deflecting and noise-silencing means in the form substantially resembling an inverted cone made of pliable matter operatively suspended in said body, and being adapted to partially yield to the intaken air by its base and with its apex over the center of the discharge and to direct such air towards the discharge.

3. In an engine noise silencer, a hollow, substantially closed body having a funnel-shaped, relatively spacious air gathering chamber, a peripheral intake for the device, the narrow portion of the funnel-shaped body forming the discharge end thereof, a silencer element in substantially the form of an inverted cone made of pliable material and being yieldably suspended by its base end from the top of the chamber, its apex extending centrally to a point at a short distance above the center of the discharge end.

4. In an engine noise silencer, a hollow, relatively spacious, substantially closed body having a cylindrical upper and a funnel-shaped lower structure, the latter terminating in a cylindrical discharge end, a removable cover closing the upper cylindrical structure, and a loosely suspended inverted cone-shaped element held in place by said cover and extending with its apex toward said discharge end.

5. In an engine noise silencer, as set forth in claim 4, cover fastening means centrally secured within the body and being adapted to extend through the cover, and a frame extending from the upper periphery of the body for supporting said cone-shaped element.

6. In an engine noise silencer, a relatively spacious hollow body composed of a substantially cylindrical upper structure and a funnel-shaped lower structure terminating in a discharge cylinder, a frame composed of a ring and converging bars resting upon the top end of the cylindrical structure, a substantially cone-shaped silencing element suspended in inverted position within the upper structure about said frame, a spider resting upon said frame and supporting an absorbent fabric member, a cover removably associated with said upper structure, and centrally disposed means for facilitating the attachment and removal of the cover and the interior parts of the device.

7. In a noise silencer, a substantially cylindrical body having intake and discharge ports, a silencing member in the form of an inverted cone element loosely suspended in the path of air drawn in through the intake port, the discharge port being of an area not more than one tenth of the intake port area, the apex of the element extending below the intake port and terminating above said discharge port.

8. The combination with a hollow chamber provided with a cylindrical, screened air intake and an air discharge, of a silencer comprising an inverted cone element operatively suspended with its base from the top of the chamber, its apex extending toward the air discharge, the body of the element being disposed in the path of the air current entering the chamber through the intake and being adapted to yield to the impact of inflowing air and to simultaneously direct air towards the discharge.

9. The combination set forth in claim 8, said inverted cone element comprising a pliable body fixedly secured along its base and at its apex, the area between the fixed base and apex being yieldable to air pressure.

WILLIAM NEUMANN.